No. 809,545. PATENTED JAN. 9, 1906.
S. J. WEVER.
CARPET STRETCHER.
APPLICATION FILED APR. 17, 1905.
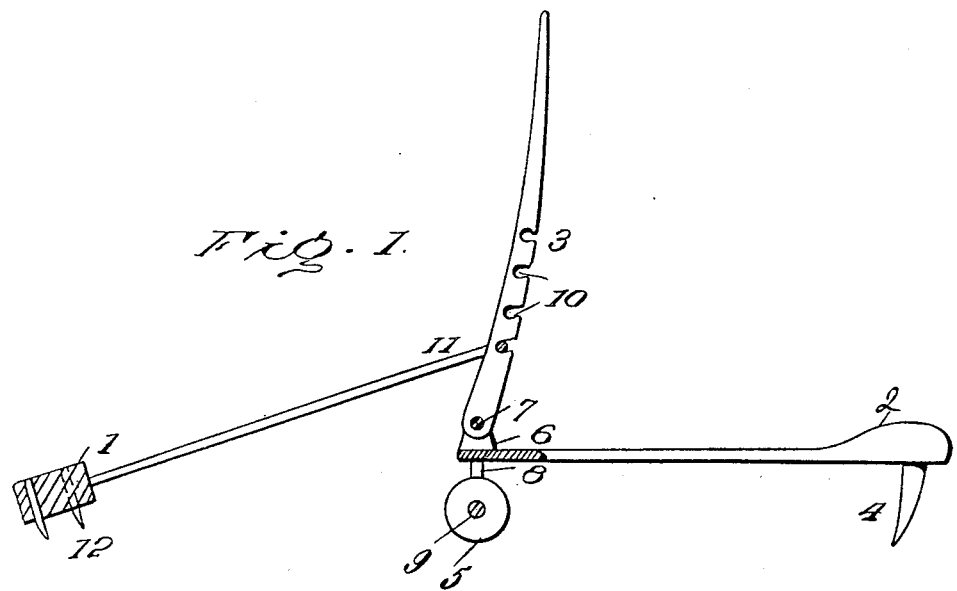
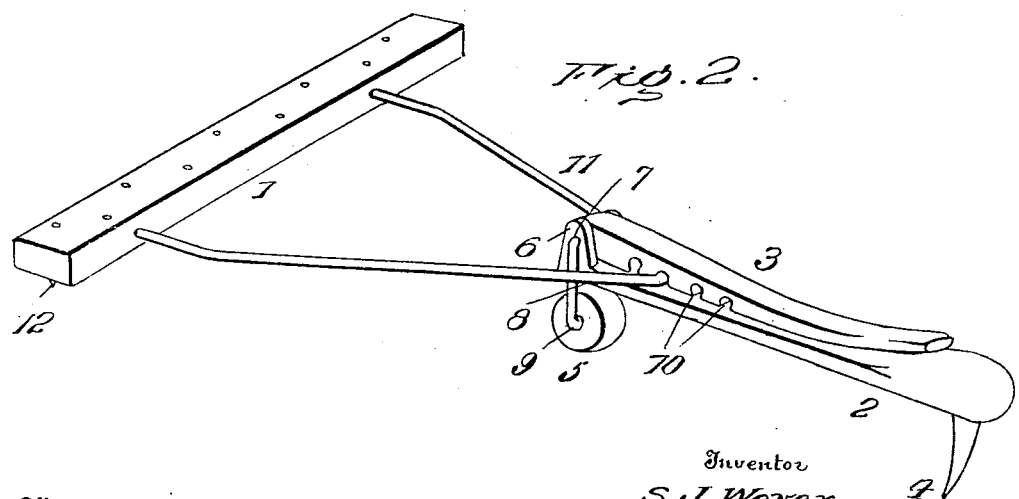

UNITED STATES PATENT OFFICE.

SEBERN J. WEVER, OF SHELLER, ILLINOIS.

CARPET-STRETCHER.

No. 809,545.　　　Specification of Letters Patent.　　　Patented Jan. 9, 1906.

Application filed April 17, 1905. Serial No. 256,075.

*To all whom it may concern:*

Be it known that I, SEBERN J. WEVER, a citizen of the United States, residing at Sheller, in the county of Jefferson and State of Illinois, have invented certain new and useful Improvements in Carpet-Stretchers, of which the following is a specification.

This invention consists of a novel form of carpet-stretcher of simplified construction and one which may be manufactured at a comparatively low cost, being particularly designed to overcome certain disadvantages in the majority of devices of this class now in use, as will be pointed out hereinafter.

For a full description of the invention and the merits thereof and also to acquire a knowledge of the details of construction of the means for effecting the result reference is to be had to the following description and accompanying drawings, in which—

Figure 1 is a vertical longitudinal sectional view showing a device embodying the invention. Fig. 2 is a perspective view of the device, the lever being partially elevated, the parts being shown in proper relative positions.

Corresponding and like parts are referred to in the following description and indicated in all the views of the drawings by the same reference characters.

Specifically describing the invention, the same consists, primarily, of three parts—namely, the carpet-engaging member 1, the floor-dog 2, and the operating-lever 3. The floor-dog 2 is provided with a spur or spurs 4 at one end, adapted to be driven into the floor near the base-board, and arranged beneath the dog near the opposite end is a roller 5. Just above the roller 5, preferably, and projected upwardly from the adjacent end of the dog 2, are spaced lugs 6, between which is pivoted the lever 3 aforesaid. The pivot 7 for the lever 3 consists of a rod passing through an end of the lever and through the apertures in the lugs 6, one end of said rod being extended downwardly at the outer side of one of the lugs 6, as shown at 8, and then projected laterally to form a journal member 9 for the roller 5. The outer side of the lug 6, adjacent which the portion 8 of the rod 7 is located, may be recessed to receive said rod to prevent any movement thereof. The lever 3 is curved and is formed at a point between its ends with a plurality of notches 10, which are of circular formation, so as to receive the outer end of a bail 11, the sides of which are rigidly connected with the carpet-engaging member 1. The carpet-engaging member 1 is preferably made of a transverse bar, of wood or like material for cheapness, having a plurality of points or projections 12 extending from the under side thereof to pass through the carpet to engage the latter. The sides of the bail 11 pass horizontally through the bar of the engaging member and are rigidly connected therewith.

The operation of the device is obvious to those versed in this art; but advantages for the structure and arrangement of parts being very important the same will be mentioned. The roller 5, which is arranged beneath the dog 2, will enable the portion of the carpet between the engaging member 1 and the spur 4 of the dog to be pulled without binding of the dog thereagainst, and this portion may be tucked under and tacked to the floor very conveniently for this reason. The lever 3 when forced over and down upon the upper side of the dog 2 will be automatically held in such position by the connection between the lever and the engaging member 1, the point of connection being in a plane lower than the pivotal support 7 of the lever, thus holding the lever in the position mentioned. Since the engaging member 1 is connected with the lever 3 by a rigid bail, the lever as it is actuated will raise the bail, causing the points or projections 12 of the member 1 to incline from the vertical, permitting the carpet engaged thereby to slide along said points against the bar forming a part of the engaging member the above obviating all likelihood of snagging or tearing the carpet—a defect in those carpet-stretchers in which the draft upon the connection between the lever and the member 1 is parallel with the floor. Further, as the lever is initially actuated the connection between said lever and the member 1 tends to elevate the latter slightly from the floor and holds it clear of the floor, so that it does not catch in the lining usually located beneath the carpet, and, further, the points 12 are not likely to catch or hang in uneven flooring-boards or cracks in the floor. The peculiar formation of the notches 10 and the arrangement of the lever causes the lever to be locked down upon the dog when tension is exerted thereon by the connection between the same and the member 1. It is clear that there is practically no wear upon the device in view of the structure before described.

Having thus described the invention, what is claimed as new is—

In a carpet-stretcher, the combination of a floor-dog, a carpet-engaging member, a lever, connecting means between the lever and the carpet-engaging member, a pivot-rod carried by the floor-dog and forming a pivot for the lever, said rod being extended and formed with a journal member beneath the floor-dog, and a roller mounted upon said journal member.

In testimony whereof I affix my signature in presence of two witnesses.

SEBERN J. WEVER. [L. S.]

Witnesses:
STEPHEN L. HETHERINGTON.
JOHN LAUR.